United States Patent
Odgers (10) Patent No.: US 8,208,720 B2
(45) Date of Patent: Jun. 26, 2012

(54) DIGITAL MEDIA WITH TOKEN FOR ANALOG RECONVERSION DETECTION

(76) Inventor: Christopher Odgers, Claremont, CA (US)

( * ) Notice: Subject to any disclaimer, the term of this patent is extended or adjusted under 35 U.S.C. 154(b) by 1034 days.

(21) Appl. No.: 12/163,612

(22) Filed: Jun. 27, 2008

(65) Prior Publication Data

US 2009/0324061 A1    Dec. 31, 2009

(51) Int. Cl.
*G06K 9/00*      (2006.01)
*H04N 11/04*     (2006.01)
*H04N 9/80*      (2006.01)
*H04N 7/167*     (2006.01)
*G11B 19/04*     (2006.01)

(52) U.S. Cl. ............ 382/162; 375/240.01; 386/252; 380/201; 380/202; 726/32; 360/60

(58) Field of Classification Search ............ 382/162; 375/240.1; 380/201, 202; 726/32; 360/60
See application file for complete search history.

(56) References Cited

U.S. PATENT DOCUMENTS

| | | | |
|---|---|---|---|
| 6,466,670 B1 * | 10/2002 | Tsuria et al. | 380/202 |
| 7,218,754 B2 * | 5/2007 | Schumann et al. | 380/201 |
| 7,447,907 B2 * | 11/2008 | Hart et al. | 713/176 |
| 7,856,116 B2 * | 12/2010 | Rodriguez et al. | 382/100 |
| 7,987,510 B2 * | 7/2011 | Kocher et al. | 726/27 |
| 2002/0141582 A1 * | 10/2002 | Kocher et al. | 380/201 |

* cited by examiner

*Primary Examiner* — Vu Le
*Assistant Examiner* — Ha Le
(74) *Attorney, Agent, or Firm* — Connolly Bove Lodge & Hutz LLP; Jonathan A. Jaech (57) ABSTRACT

A digital media with encoded audio-visual content includes an encoded token. The token comprises visual data having defined characteristics, which are designed such that when the audio-visual content is output as analog output and then re-recorded as digital data, the resulting digital data includes an altered token. Digital data may be processed to detect altered tokens indicating that the data was recorded from an analog output. When an altered token is detected, the copy may be considered to be an unauthorized copy and handled accordingly.

18 Claims, 6 Drawing Sheets

DIGITAL MEDIA WITH TOKEN FOR ANALOG RECONVERSION DETECTION

BACKGROUND

1. Field

The present disclosure relates to digital media encoded with data for causing a video display output.

2. Description of Related Art

Various methods are known for protecting digital media from unauthorized copying and use. Recent copy-protection schemes for content such as digitally-recorded movies and music have become quite robust and difficult to circumvent. As digital safeguards become more effective, unauthorized copyists of digital content may exploit what is sometimes referred to as the "analog hole" or "analog reconversion." The analog hole or analog reconversion refers to the universal susceptibility of content to analog copying. To be useful to end users, digital content must at some point be used to generate an analog signal for audio or video output. That analog signal can be captured and re-converted to digital form. The resulting digital copy of the analog output may be of very good quality, depending on the equipment used for the copying process. It may be difficult to discern any difference between output from the original digital media and output from the analog-to-digital copy. Accordingly, the value of digital copy protection schemes may be diminished via copying by analog reconversion.

Generally, a reconverted copy (that is, a digital copy from analog output) will not be identical on a bit-by-bit basis as compared to the original digital source. Therefore, a reconverted copy may be detected by comparing a portion or all of its bits to the original digital copy. For example, any number of selected bits may be compared, or bits making up a digital watermark. However, this detection method requires access to the original bit pattern used for comparison purposes. Such access may not be conveniently available in all applications, thereby limiting the ability to detect reconverted copies.

It is desirable, therefore, to provide a method and apparatus for detecting and disposing of reconverted analog copies, which overcomes the limitations of the prior art.

SUMMARY

The present disclosure is directed to digital media encoded with data for causing a video display output, and related methods for detecting reconverted copies of digital media made via the analog hole.

In some embodiments, a flat, noise-free visual graphics field is prepared using computer graphics and included in a portion of a video file. As used herein, a "video file" refers to a file containing encoded audio-visual content, such as an "MPEG" or other encoded file for digital content. The video file may include digital-source and analog-source content. For example, some portions of the content may be generated digitally using software. Titles, digital special effects, and digital animation content exemplify digitally-generated content. Other portions of the content may comprise real-life scenes that are filmed and converted to digital form, or recorded using digital cameras. This may be considered analog-source material. The flat, noise-free field may be created digitally and included at one or more places in the video file that are difficult or inconvenient to omit from a copy, as a digital token. For example, the flat field may be included in the film titles or credits, or blended with objects appearing in a photographed scene.

The flat field may be selected and configured so as to be unobtrusive to a consumer when viewing audio-visual output from the video file. The flat-filed digital token may be included in 2 or more contiguous I-frames of video data. As used herein, "I-frame" means a picture in video data that is encoded without reference to any other picture. I-frames may also be referred to as slices or key frames. The flat field used as a digital token may span 2 or more I-frames. More than one flat-field digital token may be included in any given video file or I-frame.

The flat field may be configured as a noise-free, contiguous flat field of any color, including gray or any other noise-free color. The pixel area may be any size large enough to survive analog output and reconversion to digital and to provide a sample large enough to provide a statistically significant measure of noise introduced by reconversion. For example, pixel area may be 1000 pixels or larger. The token size should be selected to be greater than the resolution of the analog output and useful digital copies. The flat field should be free of noise and have a characteristic color or intensity spectrum. A "flat field" is a defined set of pixels having one or more color values that are set to one or more defined characteristic values. A characteristic value may comprise a single value. In the alternative, characteristic values may comprise multiple isolated values separated by color value gaps in which no pixels appear.

The video file may then be encoded on a digital media as known in the art. For example, the file may be encoded on a DVD, Blu-Ray, HD DVD, or other optical media, or recorded in a magnetic media or electronic memory, either for a transient period or more permanently, to produce a digital media with encoded data configured for causing an audio-video output, such as MPEG-encoded data. The encoded data includes the flat-field token. If analog output generated by the encoded data is recorded and digitized, the flat field will also be recorded and digitized.

According to an aspect of the technology, digital copies may be analyzed for the presence of a reconverted flat field. A reconverted flat field may be recognized by the presence of noise in a spectral analysis of the field. If the field is noise-free, it may be assumed to be an original file or digital copy. If the flat field includes noise characteristically caused by analog reconversion, it may be assumed to be a reconverted copy.

Measures may be taken to discourage or prevent an unauthorized copyist from replacing a reconverted flat field with a noise-free digitally generated flat field in the reconverted video file. One useful measure may be to hide the digital flat field in two or more I-frames of the video file, so that it is difficult to detect. For example, the field may be camouflaged by being placed in a region of similar coloring, such as a small gray field in a fog bank, and so forth. The presence of the field may be made difficult or impossible to detect visually in this manner. A further measure may be to limit the number of I-frames in which the field appears, such as, for example, to two or three frames. In adjacent frames, the flat field may be replaced by a non-flat field of similar color. Also, it may be useful to place flat field noise-free tokens in various different locations of the video file.

The location and configuration of the tokens may be recorded in a secure database associated with digital media. When analyzing a video file, an analysis agent may open a secure connection to the database to obtain a location or locations of the digital token in the video file. The tokens may then be analyzed to verify that they are noise-free or to determine whether they match a characteristic spectrum defined for the original token.

A more complete understanding of the digital media with token for analog piracy detection will be afforded to those skilled in the art, as well as a realization of additional advantages and objects thereof, by a consideration of the following detailed description. Reference will be made to the appended sheets of drawings which will first be described briefly.

DETAILED DESCRIPTION OF VARIOUS EMBODIMENTS

Using the methods and apparatus disclosed herein, analog reconversion of digital video files may be accurately detected. Detection may be useful for analysis and measurement of analog reconversion piracy. Detection may also be useful in digital rights management (DRM) system to discourage analog reconversion piracy, such as by refusing to play reconverted disks.

Figure 1:
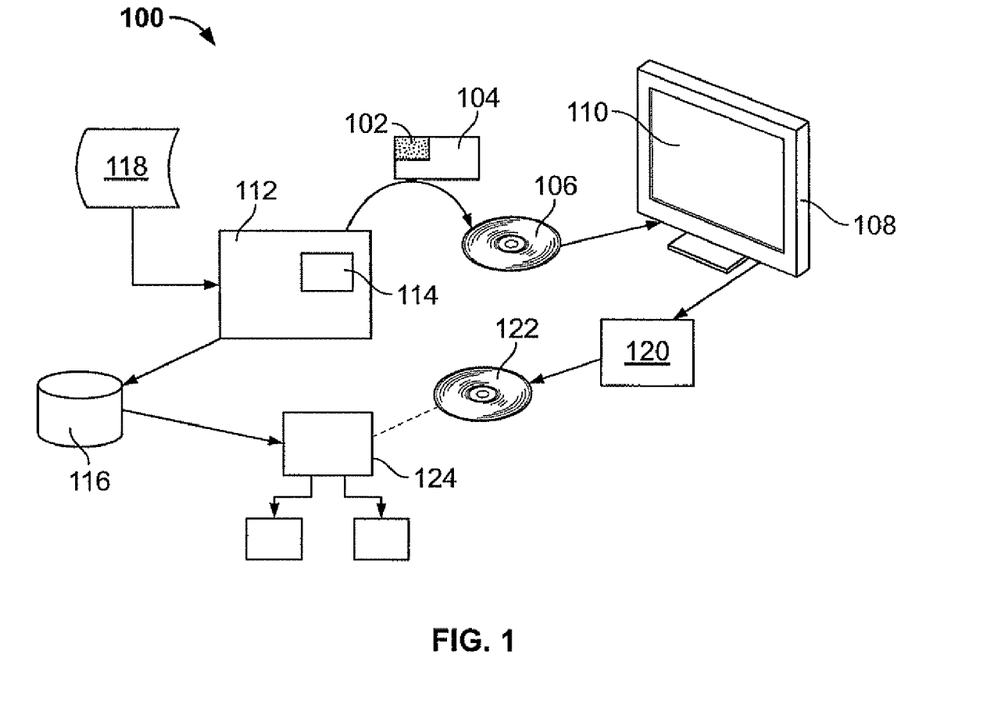
FIG. 1 is a schematic diagram showing aspects of a system including a digital token for analog piracy detection, and related aspects.

FIG. 1 shows aspects of a system 100 including a digital token 102 in a video file 104 for analog piracy detection, and related aspects. The video file may be output from a video editing system 112 including a token management component 114 configured for defining and placing digital tokens as described herein in video files. The video editing system 112 may comprise any suitable computer-aided editing and video production system as known in the art. The video editing system may receive video data 118, comprising analog data, digital data, or both from an external source and provide tools for preparing a video production from the raw video data 118.

The token management component 114 may comprise in part software tools for creating digital graphics content and placing content in pictures of a video file, such as are known in the art. In the alternative, or in addition, the token management component may comprise specialized software tools adapted for defining and placing digital tokens in video files so that the tokens blend in with the image and are difficult to discern as a separate element. The token management component may also comprise tools for recording the location or configuration of digital tokens in a video file in a database 116 or other suitable data storage component. The token management component may include general purpose, specialized components, or both. Any of its component parts may be configured to operate in coordination with the video editing system, or independently of it.

The video file 104 may be encoded on a digital media 106 using any suitable digital video encoding scheme, for example MPEG-1, MPEG-2, MPEG-4, Quicktime, Windows Media, Oracle (API), or others. Tangible media 106 may comprise an optical, magnetic, or electronic media, for example a DVD, HD-DVD or Blu-Ray disk, a magnetic storage device such as a hard drive, or an electronic storage device such as a USB memory device. The encoded media 104 may be configured for play on a video playing device 108, which decodes the file and provides a digital or analog video output to cause a video display on display screen 110. Generally, it may be desirable to hide the digital tokens so that they are not readily perceptible to a human viewer of the video display.

The video shown on video display 110 may be recaptured using a recording device 120, such as a digital video camera or analog-to-digital converter/recorder, and recorded on a second digital media 122. Some playing devices output an analog video signal that may be captured directly and reconverted to digital output, without using a camera. Such recording devices, when provided with a high-quality analog signal, may produce reconverted digital copies that are difficult to distinguish from the original digital version. However, conversion from digital to analog and back to digital inevitably involves the introduction of some random noise in the resulting video data, even if that noise is not visually perceptible. System 100 therefore includes elements for reliably detecting the presence of re-conversion noise using digital tokens.

To this end, the reconverted digital media 122 may be read and analyzed by a detection component 124. The detection component may comprise computer hardware and software for image editing and analysis, including components known in the art and new components for carrying out steps described herein. The detection component may be configured to first locate one or more digital tokens in a digital video file by accessing the database 116 or other suitable data storage element to determine the location and configuration of the digital token. In the alternative, or in addition, standard predetermined values may be used to define either the location or configuration of the digital tokens in a digital video file encoded on media 122. If so, the detection component may locate the digital tokens using predetermined values. After locating each digital token, the detection component may decode and decompress the encoded video data for the digital token and sample digital color and/or intensity values for pixels located in the screen area reserved for the token, determine a characteristic distribution of color values for the sampled pixels, and compare the characteristic distribution of color values for the digital token to a noise-free characteristic distribution to determine whether or not additional noise is present.

As used herein, "color values" may encompass any one or combination of parameters that affect pixel appearance, such as, for example, RGB hue, brightness, and saturation. A characteristic distribution of color values for sampled pixels is sometime referred to herein as a "color spectrum" or "histogram." Color spectrums may be analyzed such as disclosed herein to determine a noise component, such as may be caused by reconversion. Any suitable process for determining a measure or value of a noise component may be referred to as "measuring a color spectrum noise component." As used herein, a "location" of a digital token refers to information that identifies which frames of the video file include the token and to information that identifies where in each frame the token can be found.

Figure 2:
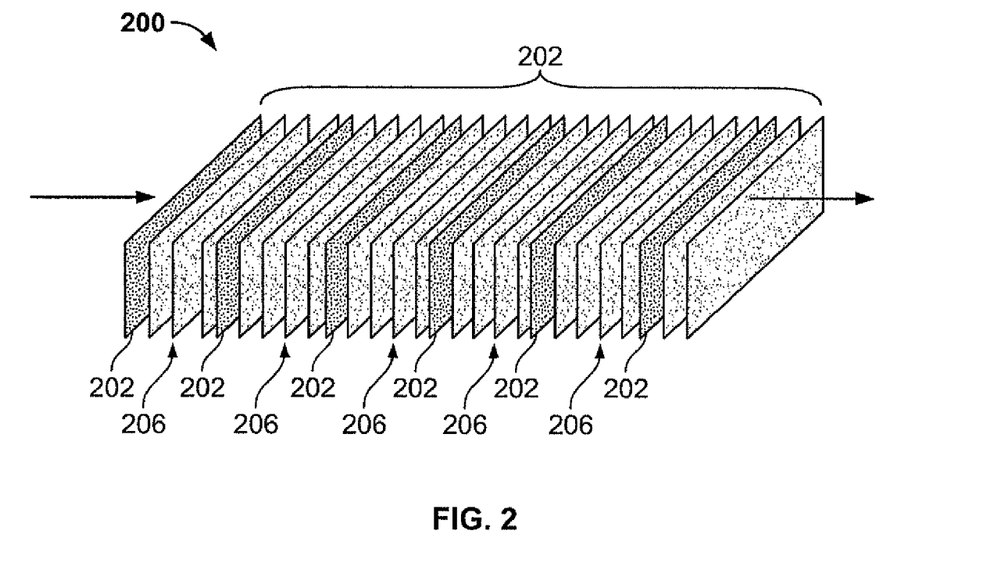
FIG. 2 is a schematic diagram showing exemplary frames of a video file for video content including digital tokens.

The digital token 102 may be provided on a limited number of I-frames making up an encoded video file 104. FIG. 2 shows a schematic of exemplary frames 202 of a video file 200 for MPEG-encoded video content including digital tokens. However, the present technology is not limited to MPEG-encoded video files, and may be extended to other formats by one of ordinary skill. Encoded frames may include I-frames 204 and interspersed with delta frames 206, comprised of P-frames and/or B-frames.

A digital token may be located on at least two consecutive ones of the I-frames 202. This may ensure that the token is re-encoded on at least one I-frame of the reconverted digital video file. Generally, the fewer the number of I-frames that include a token, the more difficult it may be for a would-be pirate to identify the token in the original file. Conversely, the greater the number of I-frames used, the more easily the reconverted token may be located for analysis. For the purpose of detecting a reconverted digital token, analyzing a token from a single I-frame may suffice. However, it may be advantageous to use tokens from more than one frame for greater reliability. The detection component 124 may locate the digital token in an original or reconverted file by looking up the token location associated with the particular video title under analysis from the database 116 or other data source. In the alternative, or in addition, token locations may be standardized across multiple video titles.

Once the token location is known, locating the frame or frames on which a digital token appears should be a trivial matter for original (i.e., not analog reconverted) video file, using time or frame numbering. In a reconverted file, timing and frame numbering will generally not exactly match the original file. A token that appears on frames 2000-2005, or at some exact time (e.g. 10.00 seconds) after the start of the video clip might appear on an earlier or later set of frames in a reconverted copy. Placing the token on a relatively large number on consecutive frames, for example, on 30 or more frames, may alleviate the problem of locating the token in a reconverted copy. In addition, or in the alternative, the token may be located relative to a readily identifiable frame other than the start or end of the video clip. This reduces the likelihood that a minor amount of clipped (i.e., removed) content at the start or end of a reconverted file will result in a lost token. A readily identifiable frame may be any frame that initiates an abrupt visual change, such as may be caused by a cut to a new scene or other visual change.

Location information may also include the location of the token within a frame, and the shape or other configuration of the token. Less than the entire digital token may be sampled so as to reduce effects from registration errors, that is, from errors in the location parameters of the digital token. For example, sampling may be performed only in a portion of the token that is within a defined margin of a token boundary. The digital token may include all pixels of an I-frame, or less than all pixels in an I-frame. The token may occupy a contiguous pixel area, or may comprise a discontinuous pixel set. That is, the pixels making up the digital token may be separated by intervening pixels that are not part of the digital token.

Figure 3:
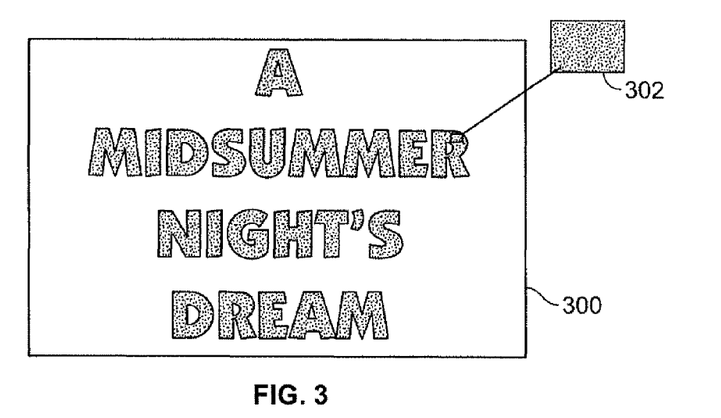
FIG. 3 is a view of an exemplary video frame showing an exemplary configuration of a digital token.

FIG. 3 shows an exemplary video frame 300 showing an exemplary configuration of a contiguous digital token 302. In this example, the digital token 302 forms some portion or all of the lettering used in a film title. Lettering is often created digitally and therefore can provide a convenient vehicle for digital tokens.

Figure 4:
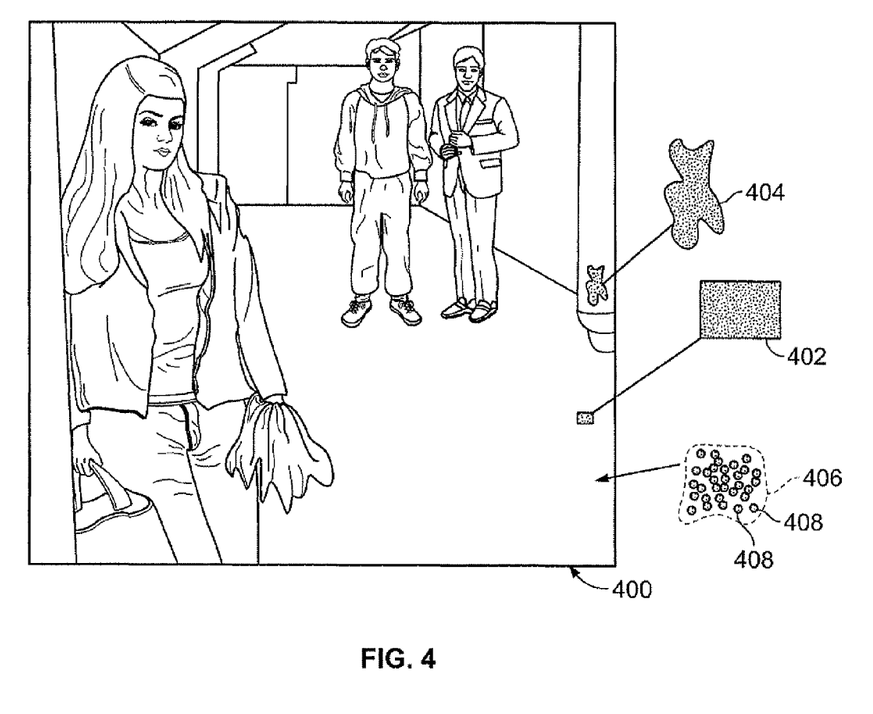
FIG. 4 is a view of a second exemplary video frame showing additional exemplary digital token configurations.

FIG. 4 shows an exemplary non-title video frame 400 showing various additional exemplary digital token configurations. The video frame may exclude any visually apparent digitally-created objects, such as titles. However, pixels in the exemplary tokens 402, 404 and 406 may be digitally set or mapped so as to provide a characteristic noise-free color spectrum for the token. Color values for these tokens may also be selected to blend in with the scene depicted in the video frame, so as to be difficult or impossible to discern visually. Digital token 402 exemplifies a contiguous token having a regular geometric shape, in this example a rectangle. The token is located in a portion of the video frame 400 so that it blends in with the depicted scene. Token 404 exemplifies a similar type of token having an irregular shape.

Digital token 406 exemplifies a non-contiguous type of token made up of separate pixels or pixel regions 408. Tokens of this type may be readily blended in with almost any arbitrary scene. They may be generated by setting all pixels within a certain color value to a defined average value. For example, all pixels within 1% of a defined brightness in a selected frame may be set equal to the defined brightness. This may cause no visible alteration of the scene while creating a defined set of pixels having a single, noise-free brightness value in the altered frame. Meanwhile, the location of the token may be conveniently defined as all pixels in the altered frame having a brightness value within 1% of the defined brightness value. In the original digital version, a brightness histogram all such pixels will have a characteristic noise-free spike exactly on the brightness value. In a reconverted copy, reconversion noise will be visible as a substantial number of pixels counted on either side of the defined brightness value.

Figure 5A:
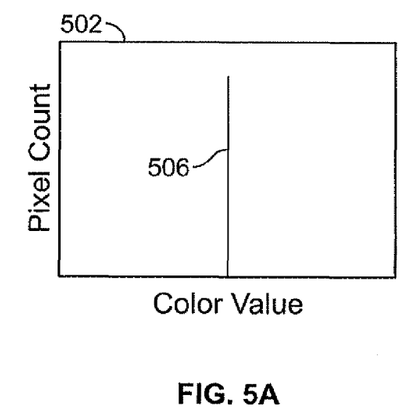
FIGS. 5A-B are exemplary color spectra for a digital token before and after reconversion, respectively.
Figure 5B:
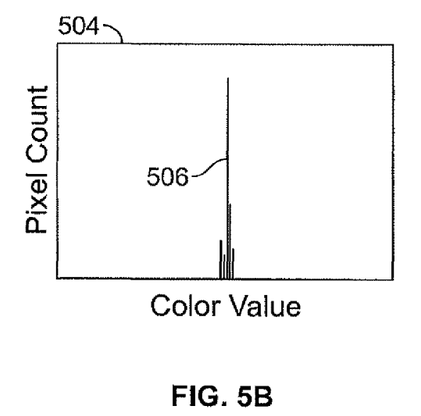

These differences are illustrated schematically by FIGS. 5A-B, which show exemplary color spectra 502, 504 for a monotone digital token before and after reconversion, respectively. In FIG. 5A, a single color value 506 for all sampled pixels is evident. In FIG. 5B, some number of pixels fall on either side of the single color value. These pixels represent random noise in brightness or other color values falling on either side of the defined digital token value. Such noise may be readily discerned in the histogram, and may also be detected using a filtering algorithm and a noise threshold. The principle illustrated by FIGS. 5A-B should hold true for both contiguous and non-contiguous token types.

Figure 6:
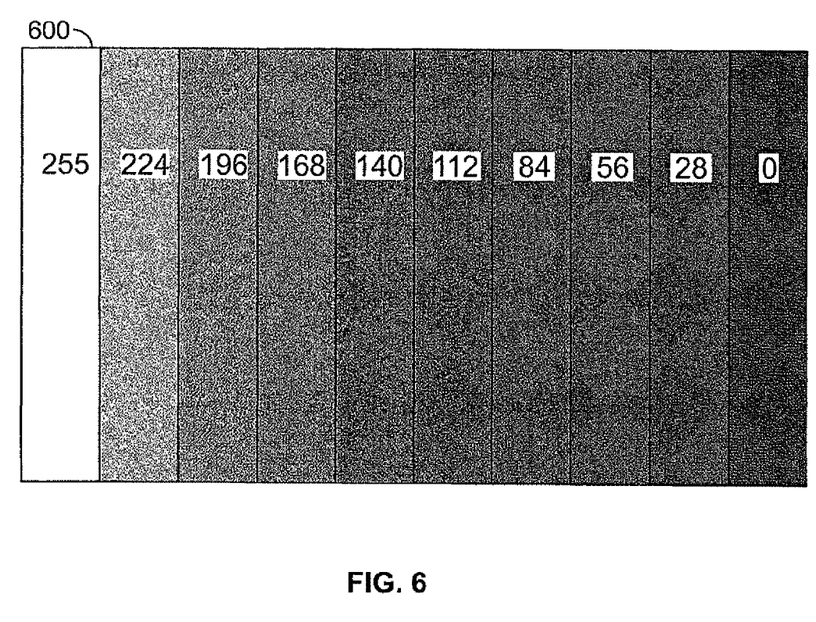
FIG. 6 shows an exemplary configuration for a multi-tone digital token.

Digital tokens may comprise pixels having more than one color value. FIG. 6 shows an exemplary configuration for a multi-color digital token 600. Token 600 comprises pixels having various brightness values or shades of gray. Each color value in the token may be separated from other color values by a gap. Multi-color tokens may be provided in any desired contiguous or non-contiguous configuration.

Figure 7A:
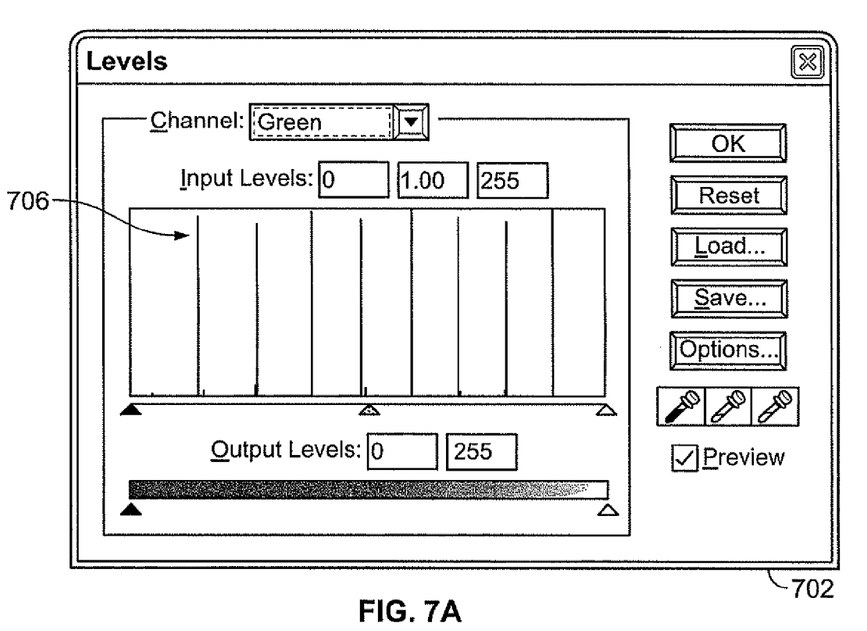
FIGS. 7A-B are exemplary color spectra for a multi-tone digital token before and after reconversion, respectively.
Figure 7B:
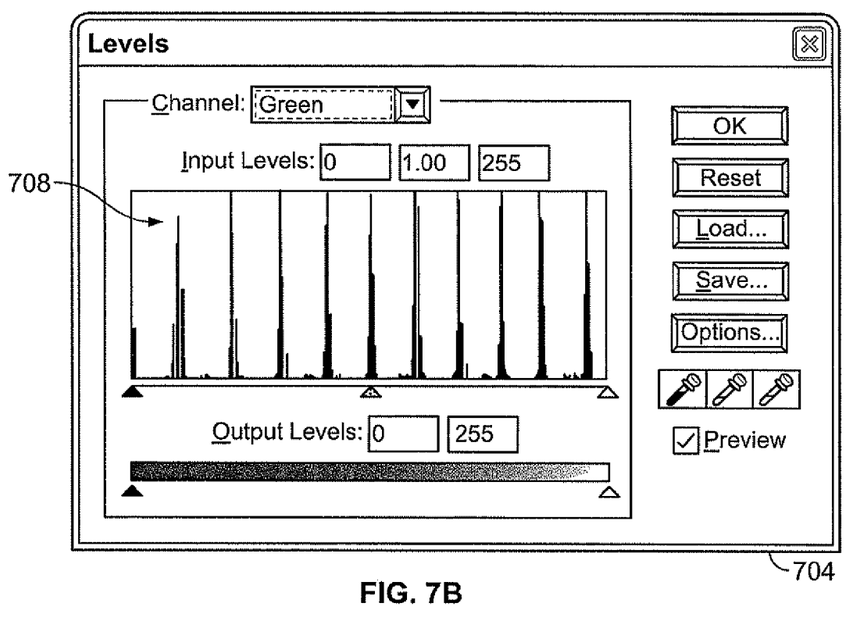

FIGS. 7A-B show exemplary color spectra 702, 704 for a multi-tone digital token before and after reconversion, respectively. In FIG. 7A, a series of peaks 706 are separated by noise-free gaps. In FIG. 7B, peaks 708 correspond to peaks 706, but gaps between the peaks 708 contain readily discernible noise. Hence, the token signature may be readily recognized as corrupted by reconversion, so the copy from which the token is taken may be also recognized as a reconverted copy. At the same time, the reconverted token may also be readily recognizable as having a color spectrum that is characteristic of the original digital token, which is distinct from randomly selected pixels of the video file. This may confirm that the measured noise arose from reconversion of a digital token.

Depending on the characteristic "signature" (i.e., color spectrum) of the digital token, the question of whether or not measured noise has arisen from reconversion may be confirmed without consulting a database, using standardized token signatures. Tokens may be defined by characteristic band gaps or other features that are difficult to detect visually but readily measured once the location and configuration of the token is known. For example, a signature may be defined by some plural number of peaks separated by a defined band gad, such as three brightness peaks separated by gaps of 12.5%, or any other desired combination. A signature may also be characterized by peaks at defined color value levels, a defined peak height, or any suitable combination of the foregoing. Token signatures may be standardized and varied periodically or maintained constant. Even if standardized token signatures are used, parameters for various standard token may be maintained in a suitable data storage repository.

Figure 8:
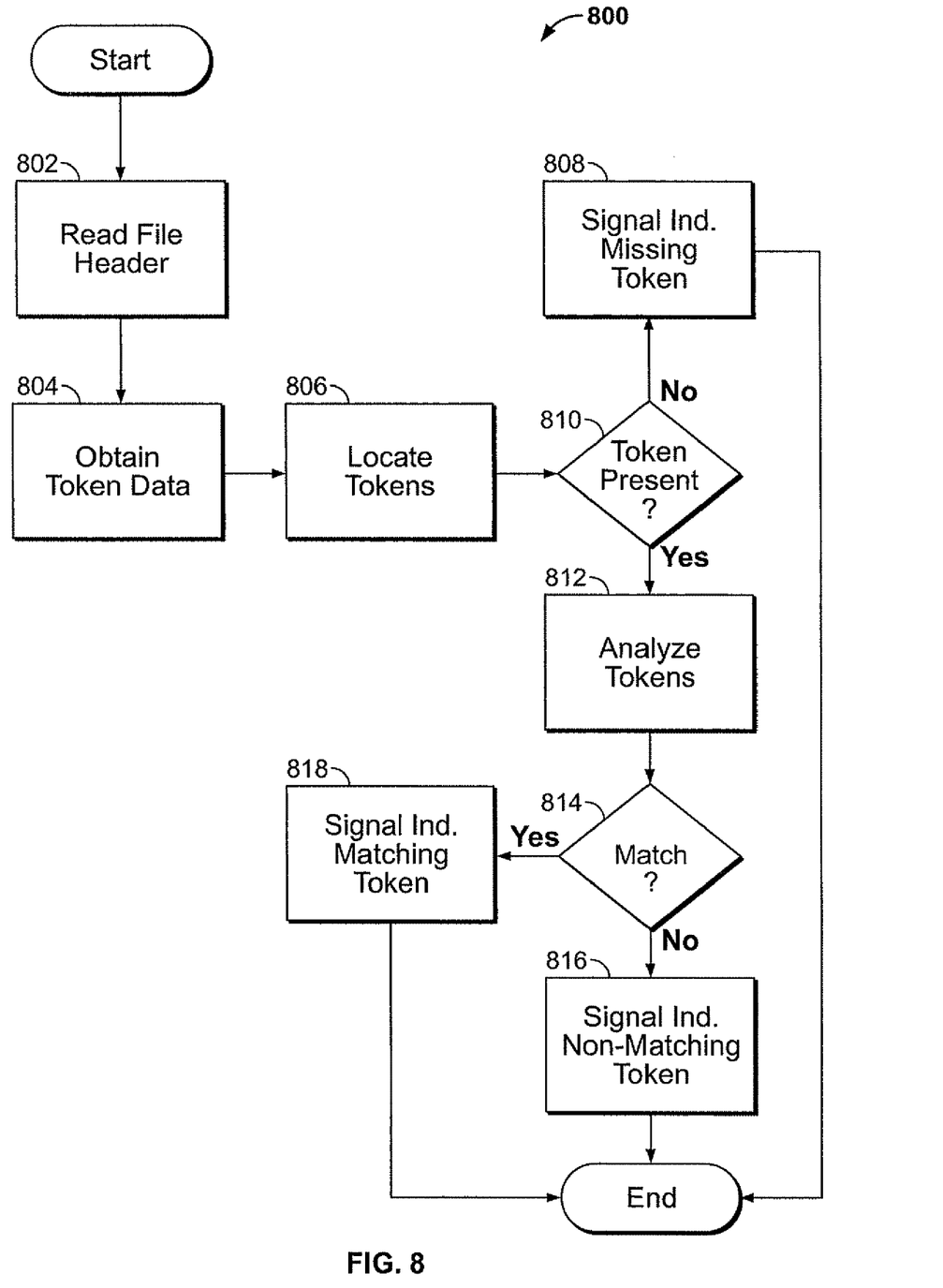
FIG. 8 is a flow chart showing exemplary steps of a method for detecting an analog reconverted video file.

The foregoing technological principles and systems may be applied in various practical methods. FIG. 8 shows exemplary steps of a method 800 for detecting an analog reconverted video file. Method 800 may be performed by any suitable detection component. The detection component may reside in a consumer playing device and be used for digital rights management purpose. In the alternative, the detection component may be a separate device dedicated for analysis of digital media. In either case, signals generated at steps 808, 816 and 818 may be provided to a DRM component for use in DRM and/or recording, or simply recorded for use in analysis. Instructions for performing method 800 may be encoded on computer-readable media for causing a computer to perform some or all of the described steps.

In either application, method 800 may be initiated when a detection component is provided with a video file for analysis. At step 802, the component may read header information or other identifying information, which may include a serial number, title, version number, and any other information used to identify the video file. Identifying information may include, or consist entirely of, a watermark that is configured to survive a reconversion process. Identification of the work may also be performed manually, such as by using a human reviewer to identify the video file. In the alternative, the video file may be left unidentified.

At step 802, token data for the file may be obtained. Token data may include both location and configuration data. For example, token data may provide information necessary to sample a portion or all of each digital token from the video file, and information describing a characteristic color spectrum for the digital file. Token data may be obtained from a database or other data source. Some or all of the obtained token data may be specific for the identified video file. In the alternative, or in addition, some or all of the token data may apply to digital tokens for different video files generally.

At step 806, tokens in the video file may be located and sampled. Sampling may be performed by recording pixel values for pixels located within a frame of the video file and within the parameters defining the configuration of the digital token. To perform this step, the encoded digital file may be decoded and used to generate an indicated frame or frames. Pixel values may then be sampled within the selected frame or frames and token configurations. In the alternative, decoded frames may be analyzed using a token-detecting filter until a color spectrum having a signature characteristic of a digital token is recognized. The locating and sampling process may continue until all frames designated for analysis have been sampled. At 810, if no token has been recognized, a signal may be provided indicating that one of more digital tokens has not been found, as indicated at 808. A missing token may be indicative of an overly-corrupted reconverted copy, a missing or removed token, or some failure in the detection process. In either case, method 800 may exit at this point, with or without providing a signal at 808, or may resume to locate a different token at 806 if present.

If a token is recognized, a color spectrum noise component of the token may be measured at step 812. If the color spectrum matches the noise-free spectrum defined for the token (i.e., if any differences are less than a defined threshold) at 814, then a signal indicating that the token is original or not-reconverted may be provided at 818. If the color spectrum does not match the characteristic noise-free spectrum (i.e., if any differences exceed a defined threshold), then a signal indicating that the token is not original or reconverted may be provided. After one or more digital tokens in the file are located and analyzed to produce an output signal, method 800 may conclude.

Figure 9:
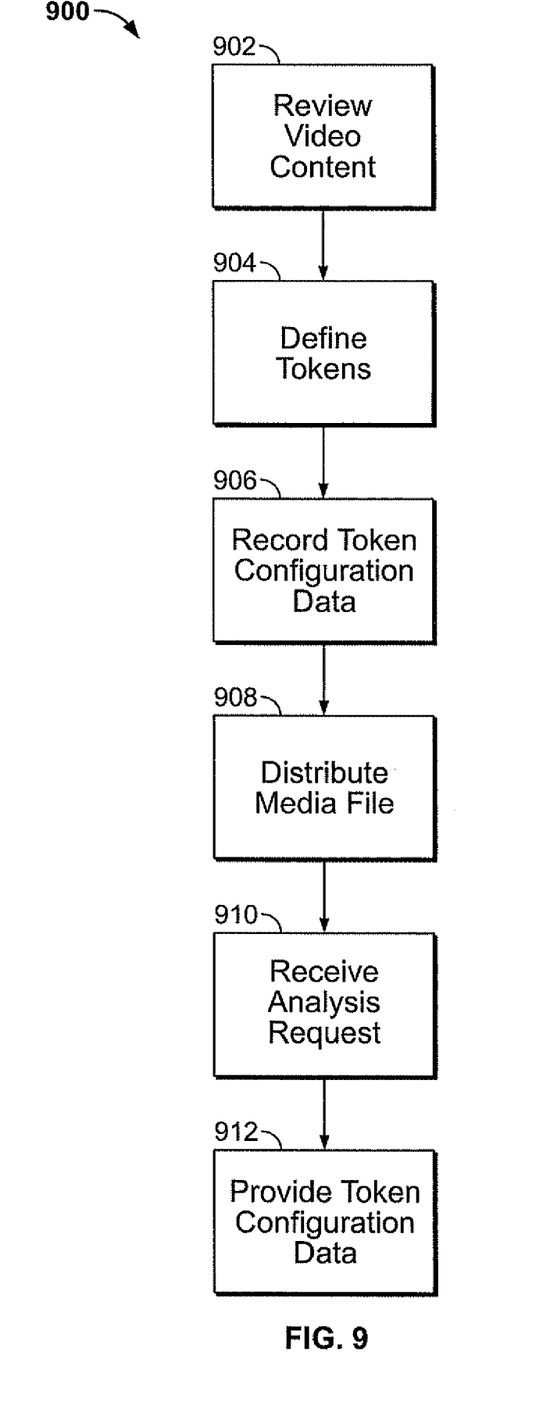
FIG. 9 is a flow chart showing exemplary steps of a method for providing a digital token for analog reconversion detection in a video file.

A related method 900 may be performed as part of video production, as shown in FIG. 9. FIG. 9 shows exemplary steps of method 900 for providing a digital token for analog reconversion detection in a video file. Instructions for performing method 900 may be encoded on computer-readable media for causing a computer to perform some or all of the described steps.

At step 902, the video file may be reviewed to select a suitable range of frames in which a digital token is to be created. Once the frames to contain the digital token are defined, a digital token of a type described herein may be digital created and inserted in the picture data for the selected frames. The digital token may be of a mono-color or multi-color type, and should include noise-free pixels defined by its characteristic color value or values.

At step 906, configuration data for the inserted token may be recorded. The inserted token may conform to a standard type as to any or all of its defining parameters. If a standard token is used, the recording step is effectively subsumed by a prior action of defining and recording a standard digital token. If any token parameter is unique to or otherwise characteristic of the video file in which it is placed, at least this parameter should be recorded and associated with an identifier for the video file, such as in a database. Standard token signatures may also be recorded.

At step 908, the video file including the digital token may be distributed to multiple clients. For example, the file may be copied onto digital media articles, such as DVD, HD-DVD, or Blu-Ray disks, and distributed to market. Copies of original digital files may also be broadcast wirelessly or transmitted via a packet-switching wide area network, such as the Internet. However distributed, the video file may be distributed in multiple copies for use by multiple clients in its intended market.

Either client devices or some independent monitoring node may receive digital original copies or reconverted copies of the video file and implement a process such as exemplified by method 800. This may cause requests for token configurations and locations to be generated for use in the method. At step 910, these requests may be received, such as by a host via a computer network. As previously noted, the requests may identify a particular video file or may more generally apply to a class of video files sharing similarly-configured digital tokens. At step 912, recorded configuration information for the digital token that is requested may be retrieved and transmitted by the host to the requesting client device in response to the request. Thus, the client device may be enabled to initiate or complete an token-analysis process. In the alternative, the client devices may provide color spectrum data for a token to a host, and the host may determine whether the provided color spectrum is valid or indicates a reconverted file.

Depending on the type of token to be generated, steps 902 and/or 904 may or may not require human review and intervention. An automated process may be used to generate digital tokens in video data, with no or limited human intervention. In the alternative, generating and placing the token may be configured to require human manual control.

Having thus described embodiments of a digital media with token for analog piracy detection, it should be apparent to those skilled in the art that certain advantages of the foregoing method and apparatus have been achieved. It should also be appreciated that various modifications, adaptations, and alternative embodiments thereof may be made within the scope and spirit of the present technology. For example, examples involving digital video data have been described, but it should be apparent that a corresponding process may also be performed for digital audio data. The scope of what is claimed is defined by the following claims.

What is claimed is:

1. A method for detecting an analog reconverted video file, comprising:
   requesting a location and original configuration of a digital token in a digital encoded video file from a data source;
   receiving location data recording the location of the digital token and the original configuration from a data source, wherein the original configuration specifies a characteristic color noise component and the location data specifies corresponding regions of at least two contiguous I-frames of video content in the video file;
   locating the digital token in the video file, based on the location data;
   measuring a color noise component of the digital token;
   comparing the color noise component of the digital token to the characteristic color noise component specified by the original configuration;
   transmitting a signal indicating that the video file is an analog reconverted file, if the color noise component is greater than the characteristic noise component of original configuration; and
   transmitting a signal indicating that the video file is not an analog reconverted file, if the color noise component matches the characteristic noise component of the original configuration.

2. The method of claim 1, wherein the original configuration specifies a flat-field noise-free color region.

3. The method of claim 1, wherein determining the location and original configuration of the digital token further comprises obtaining the location and original configuration from a database.

4. The method of claim 1, further comprising:
   defining the location data and the original configuration of the digital token;
   recording a location of the digital token in the location data; and
   providing the location data for remote authentication of distributed digital copies of the video file.

5. The method of claim 4, further comprising defining the corresponding regions characterized by being gray in color.

6. The method of claim 4, further comprising defining the corresponding regions characterized by a standard color applicable across multiple video files.

7. The method of claim 4, further comprising defining the corresponding regions characterized by a single color value.

8. The method of claim 4, further comprising defining the corresponding regions characterized by multiple color values.

9. The method of claim 4, further comprising distributing the digital copies of the video file to remote players.

10. The method of claim 1, further comprising recording the characteristic color noise component specified by the original configuration.

11. The method of claim 10, further comprising providing the original configuration for remote authentication of the digital copies.

12. The method of claim 1, further comprising recording a shape of the corresponding regions.

13. The method of claim 12, further comprising providing the shape for remote authentication of the digital copies.

14. The method of claim 1, further comprising matching a color of the corresponding regions to a color adjacent to the corresponding regions.

15. The method of claim 1, further comprising receiving requests for the location data from remote clients.

16. The method of claim 15, further comprising transmitting the location data in response to the requests.

17. The method of claim 16, further comprising receiving color spectrum data from the remote clients for a region indicated by the location data.

18. The method of claim 16, further comprising determining whether the color spectrum data matches the characteristic color noise component specified by the original configuration.

* * * * *